US011937066B2

(12) United States Patent
Starobin et al.

(10) Patent No.: US 11,937,066 B2
(45) Date of Patent: Mar. 19, 2024

(54) ACTIVE CANCELLATION OF A HEIGHT-CHANNEL SOUNDBAR ARRAY'S FORWARD SOUND RADIATION

(71) Applicant: Polk Audio, LLC, Owings Mills, MD (US)

(72) Inventors: Brad Starobin, Baltimore, MD (US); Scott Orth, Laurel, MD (US); Stuart W. Lumsden, Baltimore, MD (US)

(73) Assignee: Polk Audio, LLC, Carlsbad, CA (US)

( * ) Notice: Subject to any disclaimer, the term of this patent is extended or adjusted under 35 U.S.C. 154(b) by 276 days.

(21) Appl. No.: 17/436,932

(22) PCT Filed: Mar. 9, 2020

(86) PCT No.: PCT/US2020/021745
§ 371 (c)(1),
(2) Date: Sep. 7, 2021

(87) PCT Pub. No.: WO2020/181288
PCT Pub. Date: Sep. 10, 2020

(65) Prior Publication Data

US 2022/0159397 A1 May 19, 2022

Related U.S. Application Data

(60) Provisional application No. 62/815,204, filed on Mar. 7, 2019.

(51) Int. Cl.

| | |
|---|---|
| ***H04S 7/00*** | (2006.01) |
| ***H04R 3/12*** | (2006.01) |
| ***H04R 5/02*** | (2006.01) |
| ***H04R 5/04*** | (2006.01) |
| ***H04S 3/00*** | (2006.01) |

(52) U.S. Cl.
CPC ............... *H04S 7/301* (2013.01); *H04R 3/12* (2013.01); *H04R 5/02* (2013.01); *H04R 5/04* (2013.01); *H04S 3/008* (2013.01); *H04S 7/302* (2013.01); *H04R 2201/028* (2013.01)

(58) Field of Classification Search
CPC .......... H04S 7/301; H04S 3/008; H04S 7/302; H04R 3/12; H04R 5/02; H04R 5/04; H04R 2201/028
See application file for complete search history.

(56) References Cited

U.S. PATENT DOCUMENTS

| | | | |
|---|---|---|---|
| 4,489,432 | A | 12/1984 | Polk |
| 4,497,064 | A | 1/1985 | Polk |
| 4,569,074 | A | 2/1986 | Polk |

(Continued)

FOREIGN PATENT DOCUMENTS

WO WO 2018/112335 A1 8/2018

*Primary Examiner* — Andrew L Sniezek
(74) *Attorney, Agent, or Firm* — J. Andrew McKinney, Jr.; McKinney & Associates, LLC

(57) ABSTRACT

A multi-driver multi-channel single enclosure Height-Channel (e.g., ATMOS® or DTS-X®) enabled soundbar loudspeaker system 260 uses a novel signal processing system, driver mounting configuration (310L, 310R) and method to provide a high fidelity home theater listening experience, in a manner which relies on a new method for cancellation of unwanted direct (not ceiling-bounced) radiation of the Height-Channel (or virtual height envelopment) channel's sound 213DS.

20 Claims, 9 Drawing Sheets

(56) References Cited

U.S. PATENT DOCUMENTS

| | | | | |
|---|---|---|---|---|
| 8,054,980 | B2 | 11/2011 | Wu et al. | |
| 9,374,640 | B2 | 6/2016 | Starobin | |
| 9,648,440 | B2 | 5/2017 | Crockett et al. | |
| 9,736,577 | B2 | 8/2017 | Yamamoto et al. | |
| 9,865,245 | B2 | 1/2018 | Kamdar et al. | |
| 10,217,451 | B2 | 2/2019 | Kamdar et al. | |
| 10,863,276 | B2 | 12/2020 | Walther et al. | |
| 10,902,838 | B2 | 1/2021 | Kamdar et al. | |
| 11,190,877 | B2 | 11/2021 | Kamdar et al. | |
| 2008/0273713 | A1 | 11/2008 | Hartung et al. | |
| 2010/0119089 | A1 * | 5/2010 | Tracy | H04R 1/026 381/184 |
| 2012/0163614 | A1 | 6/2012 | Asada et al. | |
| 2015/0304791 | A1 | 10/2015 | Crockett et al. | |
| 2017/0053641 | A1 | 2/2017 | Kamdar et al. | |
| 2017/0127211 | A1 | 5/2017 | Crockett et al. | |
| 2017/0164134 | A1 | 6/2017 | Yamamoto | |
| 2017/0208392 | A1 | 7/2017 | Smithers et al. | |
| 2017/0325019 | A1 | 11/2017 | Bezzola et al. | |
| 2018/0103316 | A1 | 4/2018 | Faller et al. | |
| 2018/0184202 | A1 | 6/2018 | Walther et al. | |
| 2018/0192185 | A1 * | 7/2018 | Starobin | H04R 1/2892 |
| 2018/0242077 | A1 | 8/2018 | Smithers et al. | |
| 2018/0367939 | A1 * | 12/2018 | Fischer | H04R 3/12 |
| 2019/0116445 | A1 | 4/2019 | Gerrard et al. | |
| 2021/0409866 | A1 | 12/2021 | Orth | |

* cited by examiner

ACTIVE CANCELLATION OF A HEIGHT-CHANNEL SOUNDBAR ARRAY'S FORWARD SOUND RADIATION

PRIORITY CLAIM AND REFERENCE TO RELATED APPLICATIONS

This application claims priority to and benefit of:

(a) U.S. Provisional Application No. 62/815,204 (filed Mar. 7, 2019), entitled "Active Cancellation of an ATMOS Soundbar's Array's Forward Sound Radiation Employing the Soundbar's Front Baffle's Transducers and Steering ATMOS Arrays via Phased Array Techniques" and (b) US PCT Application PCT/US20/21745 (filed Mar. 9, 2020) entitled "Active Cancellation of a Height-Channel Soundbar Array's Forward Sound Radiation", both by Brad STAROBIN et. al., the entire disclosures of which are incorporated herein by reference.

BACKGROUND OF THE INVENTION

Field of the Invention

The present invention relates to reproduction of sound in multichannel systems generically known as "surround-sound" or "home theater" systems and more specifically to single enclosure "sound bar" style multi-driver loudspeaker systems configured for use in front of a listening space.

Discussion of the Prior Art

Listeners use two channel "stereo systems" and "surround-sound" or "home theater" audio systems for music playback and other types of audio reproduction.

Surround-sound or home theater loudspeaker systems are configured for use with standardized home theater audio systems which may include a plurality of playback channels, each typically served by an amplifier and a loudspeaker. In basic Dolby™ home theater audio playback systems, there are typically five or more channels of substantially full range material plus a subwoofer channel configured to reproduce band-limited low frequency material. The five substantially full range channels in a basic Dolby Digital 5.1™ system are typically, center, left front, right front, left surround and light surround (e.g., as shown in FIGS. 1A and 1B). The left front and right front channel loudspeakers are typically positioned in a home theater system near the left and right sides of the video monitor or television and the left front and right front channels are used by content creators for "stereo" (e.g., music) signals and sound effects.

Unfortunately, when typical surround sound (e.g., Dolby® 5.1) loudspeaker systems are installed in listener's homes, setup problems are encountered and many users struggle with speaker placement, component connections and related complications. In response, many listeners have turned to "soundbar" style home theater loudspeaker systems (e.g., 50) which incorporate at least left, center and right channels into a single enclosure (e.g., 60) configured for use near the user's video display (as shown in FIGS. 1C, 1D and 1E) and a separate subwoofer (e.g., 70). Polk Audio has developed a number of Soundbar loudspeaker systems (e.g., 50) including those described and illustrated in (a) commonly owned U.S. Pat. No. 9,374,640, (b) commonly owned U.S. Pat. No. 9,185,490, and (c) commonly owned U.S. Pat. No. 7,231,053, the entire disclosures of which are also incorporated herein by reference, for purposes of providing background information and nomenclature.

These soundbar style single enclosure loudspeaker systems ("soundbars") are simpler to install and connect and can be configured as compact, active loudspeaker products for use almost anywhere. But most soundbars provide unsatisfactory performance for listeners who want to listen to movies and music from listening positions arrayed in a typical user's listening space. Traditional home-theater installations (e.g., 10 as shown in FIGS. 1A and 1B) require the use or installation of multiple pairs of loudspeakers (e.g., a pair of front speakers 16, 18, and two pairs of surround channel loudspeakers placed laterally (26, 28) and behind 30, 32) the seating area 24, per industry-standard Dolby Digital™ and compatible formats. So traditional home theater setups place the listener in a room 12 at a listening position 24 in front of a screen or display 14 with the loudspeakers all aimed at the listening position.

Unlike home theater systems, modern commercial Cinemas are now equipped with sound systems designed to create an "immersive" or "3-D" sound field with loudspeakers mounted over the listeners to create sound images which come from sources that are in front, behind, beside and overhead. For example, the Dolby® Atmos™ system places loudspeakers in or on the theater's ceiling to provide overhead sound sources, and reproduction of Dolby® Atmos™ "height" or elevation program material is now possible using loudspeakers in the home, as described Dolby's U.S. Pat. No. 9,648,440, the entire disclosure of which is incorporated by reference for purposes of defining the background and "Atmos" Height-Channel nomenclature. A consumer or home theater enthusiast who cannot equip their home using commercial cinema sound equipment but wants to recreate the immersive 3-D sound field experienced with the Dolby® Atmos™ system can configure and install a system with "Virtual Height" speakers such as those described and illustrated in Dolby's U.S. Pat. No. 9,648,440. A competing Height-Channel or vertically immersive elevation audio reproduction speaker system is sold by DTS, Inc. in connection with the "DTS-X®" brand name.

Height-Channel speakers or speakers with upward firing elevation modules such as those described in Dolby's U.S. Pat. No. 9,648,440 (and illustrated in FIG. 1E, mostly taken therefrom) are not entirely satisfactory in actual use, however, because top-firing Height-Channel speakers do not radiate sound 108 (for the overhead sound image) solely toward the ceiling (at 104, in FIG. 1E), and thus create audibly flawed reproduced sound at the listening position (i.e., 24 in FIGS. 1A, 1B, 1D and 1E). The applicant has discovered audible sonic flaws which arise from the listener's perception of undesirable directly radiated sound 113DS from Height-Channel 110 which follows a substantially horizontal line directly from Height-Channel speaker 110 toward listening position 24 (as shown in FIG. 1E).

There is a need, therefore, for a more effective, satisfying and unobtrusive system and method for providing high-fidelity playback of cinema sound in a home theater user's listening space when the user seeks to recreate or simulate the immersive 3-D sound field experienced with modern commercial cinema systems having Height-Channel audio reproduction such as the Dolby® Atmos™ or DTS-X® systems.

SUMMARY OF THE INVENTION

Accordingly, it is an object of the present invention to overcome the above mentioned difficulties by providing a method and system for implementing a new loudspeaker configuration and signal processing method for overcoming the problems with prior art ATMOS™ or DTS-X® compatible Height-Channel speaker equipped home theater products which provides high-fidelity playback of cinema sound in a home theater user's listening space when the user seeks to recreate or simulate the immersive 3-D sound field experienced with modern commercial cinema systems such as the Dolby® ATMOS™ or DTS-X® systems.

In the system of the present invention, an ATMOS or DTS-X® enabled soundbar and subwoofer home theater sound system (somewhat like 50, in FIGS. 1C and 1D) is changed to include, in the soundbar enclosure, front facing mid-bass transducers to reproduce a band-passed phase reversed replica of the ATMOS or DTS-X® Height-Channel signals and configured to work with left and right side Height-Channel sound projecting speaker arrays which are configured and driven to provide phased array beam steering of the upwardly aimed Height-Channel (e.g., ATMOS or DTS-X®) signals. For purposes of nomenclature, in this application, the terms ATMOS or DTSX® are used interchangeably to describe, generically, Height-Channel or Virtual Height signals and speakers intended to create the desired vertically immersive elevation effect.

There are two main aspects to the system and method of the present invention, the first describes a system for substantially reducing the forward-radiating sound associated with Height-Channel (e.g., ATMOS) loudspeaker arrays (e.g., 113DS) in a Height-Channel enabled sound bar system over a limited bandwidth. By design, Height-Channel signals are intended to be beamed in a prescribed radiation pattern (e.g., 108) towards the ceiling of a media room or space (e.g., 102, at a spot 104) for reflection down into the listening area (e.g., at 24). Any significant direct radiation from a loudspeaker system (such as a soundbar enclosure, e.g., 60) toward the listener is harmful to the Height-Channel effect due in part to something the listener experiences which is referred to as the "Precedence" or "Haas" effect. The directly radiated sound (113DS) will substantially detract from the intended height cues afforded by sound that seems to originate from above (the ceiling reflected sound from 104 actually desired) because of this Haas effect. In applicant's development work, it was discovered that by employing the soundbar's front facing mid-bass transducers to reproduce a band-passed phase reversed replica of the Height-Channel (e.g., ATMOS) signals, a Height-Channel enabled soundbar having left and right side Height-Channel speaker arrays can be configured and driven to provide much better performance. The Height-Channel arrays' radiation patterns may be effectively improved in a measurable way.

Another aspect of the system and method of the present invention involves steering the sound projecting from a Height-Channel array in such a manner that its primary axis of radiation is selectable or steerable within an angular range and may generally deviate from what would ordinarily be expected based on the geometry of the array of transducers. Array steering and controls related to phased array steering control the acoustic transducers' primary axis of radiation and is accomplished in part by determining the inter array element time delay. In accordance with the generally accepted practices regarding phased array design (e.g., as described and illustrated in U.S. Pat. No. 9,736,977, to Yamamoto et al.), directivity may be improved by increasing the number of array elements which is functionally similar to increasing the array size relative to an acoustic wavelength. During applicant's Height-Channel (e.g. ATMOS) enabled soundbar development work, it was discovered that the front-to-back dimension is of particular significance with respect to steering an array's directivity.

The advantages of the system and method of the present invention include, most importantly, that the radiation pattern of each Height-Channel array of a Height-Channel-enabled soundbar is improved by effectively cancelling some portion of the forward radiating component (e.g., like 113DS, as shown in FIG. 1E) by a surprisingly effective method employing the soundbar's front-baffle mounted mid-bass drive units. Appropriate signal processing, generally including band-pass filtering, parametric equalization and delay are applied preferably to both the left and right side Height-Channel arrays (although applying it to only one array is possible). In this manner, the "secondary source" (direct radiated signal cancellation) transducers are the soundbar's mid-bass drivers which have been discovered to provide optimal performance. Another important benefit of this invention involves a requirement on the Height-Channel array in the presence of secondary cancellation sources. Without secondary cancellation sources, the Height-Channel arrays are necessarily relatively large (in the front-to-back dimension) and normally include a form of acoustic occlusion intended to block or absorb sound radiation that would otherwise radiate directly into the listening area part. Due in part to the use of the cancellation in the system of the present invention, the Height-Channel arrays themselves may be smaller in front-to-back dimension then they would otherwise be. This means the need for physically blocking or absorbing that undesired direct sound (113DS) to mitigate it reaching the seating area 24 via a direct path is greatly reduced by virtue of the inclusion of the cancellation transducers. In accordance with the phased array and steering aspect of the system and method of the present invention, a number of advantages are obtained. The inclusion of phased array steering permits a wider range of seating locations without compromising audio performance. An automated calibration scheme that determines the optimal steering angle for selected listening locations results in superior audio performance relative to conventional Height-Channel (e.g., ATMOS) enabled soundbars in which ATMOS arrays are fixed with respect to steering angle.

The upward orientation facilitates a more efficient use of enclosure volume and permits more possibilities with regard to industrial design as a means of distinguishing this novel product from conventional ATMOS™ compatible soundbars.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE PREFERRED EMBODIMENT

Figure 6:
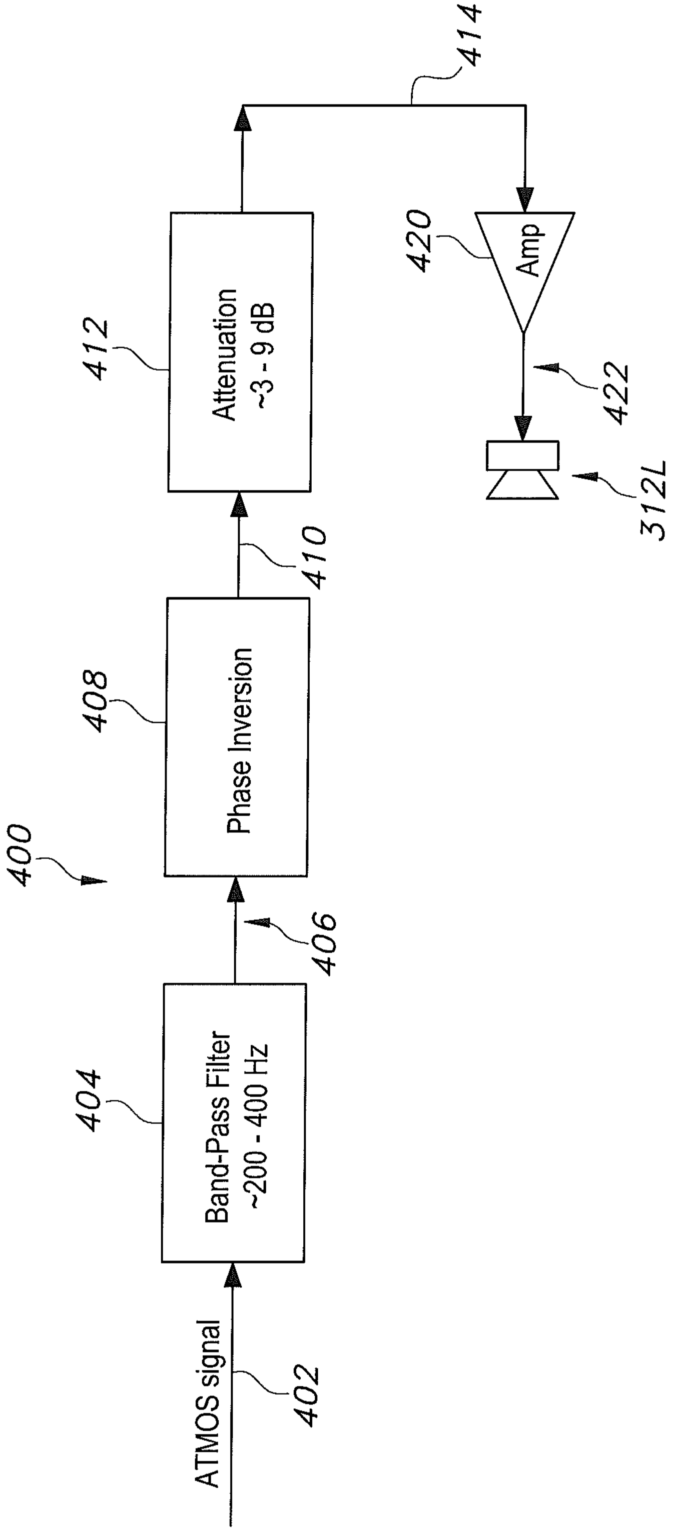
FIG. 6 is a signal flow block diagram illustrating the method for Active Cancellation of the Soundbar Height-Channel array's forward sound radiation employing the Soundbar's front baffle transducers (e.g., of FIGS. 2-5) and steering the Height-Channel Array signal via Phased Array techniques, in accordance with the present invention.
Figure 7:
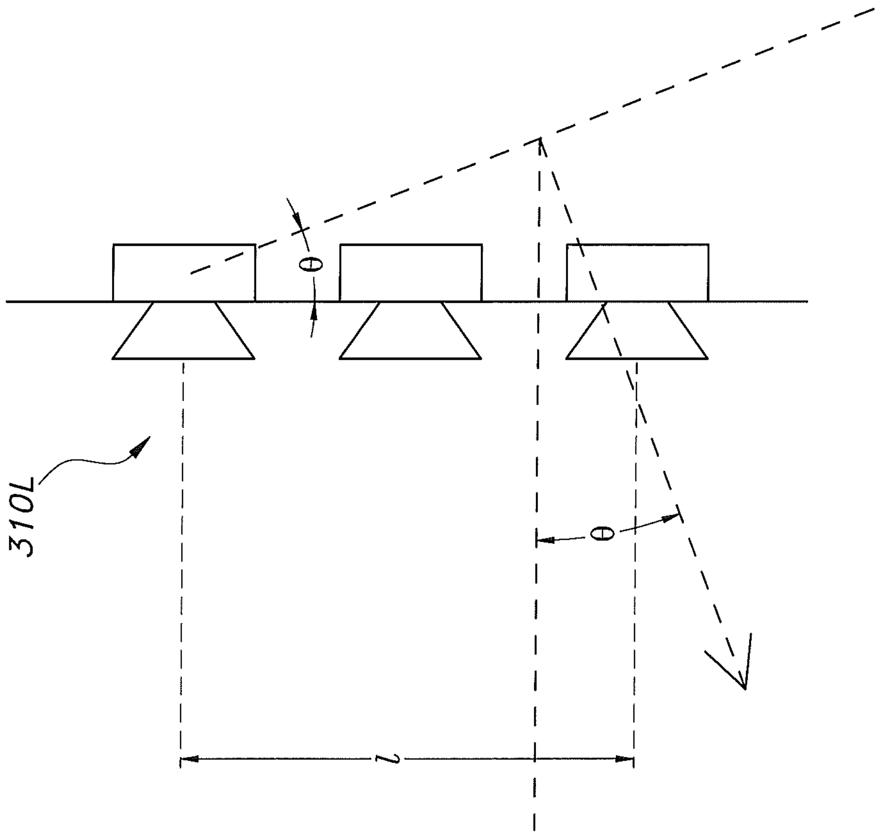
FIG. 7 is a diagram illustrating the method for steering the Height-Channel Array signal via Phased Array techniques, in accordance with the present invention.
Figure 8:
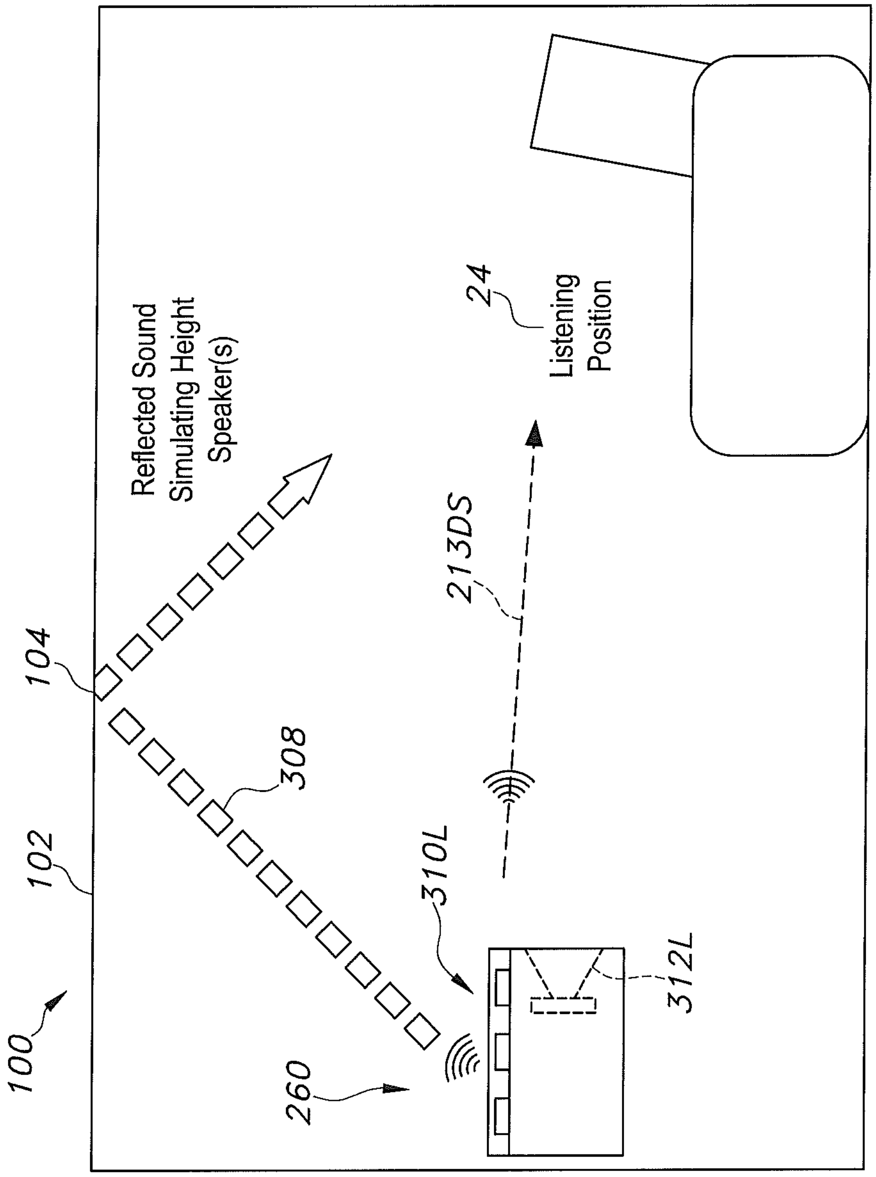
FIG. 8 is a diagram which illustrates the enhanced Height-Channel enabled Soundbar system of the present invention (as viewed along speaker axis SA) in a user's setting including a listening position illustrating the orientation of the Soundbar system components with a representation of the cancelled, undesired direct radiation sound path, in accordance with the method of the present invention.

Turning now to FIGS. 2-8, the system and method of present invention include a Height-Channel (e.g., ATMOS or DTS-X®) enabled multi-driver soundbar speaker system 260 having an enclosure 270 with front facing mid-bass transducers 312 to reproduce the "main" and "surround" signals and a band-passed phase-reversed replica of the Height-Channel (e.g., ATMOS virtual height) signals. The front mounted mid-bass transducers 312 are configured to work with left and right side Height-Channel speaker arrays (310L, 310R) which are configured and driven to provide phased array beam steering of the upwardly aimed Height-Channel signals (308, as best seen in FIG. 8). For purposes of defining a broad descriptive nomenclature, in this application, the term Height-Channel is used to describe, generically, the channel(s) for Virtual Height signals and speakers intended to create the desired vertically immersive elevation effect in popular commercial (e.g., ATMOS™ or DTS-X®) systems, so left and right side Height-Channel sound projecting speaker arrays (310L, 310R) are referred to variously as virtual height speaker arrays or Height-Channel arrays.

In accordance with the configuration and method of the present invention, the lower portion of the Height-Channels' bandwidth that would otherwise be part of the undesired direct radiation signal (213DS) radiating directly forward into the listening area 24 is cancelled acoustically. A cancellation signal is generated and radiated from the soundbar's front firing speakers 312. As illustrated in FIGS. 6 and 8, a direct signal cancellation signal is generated by receiving the Height-Channel (e.g., ATMOS) channel content, band-pass filtering the Height-Channel channel signal, phase inverting the Height-Channel channel signal, and then delaying the phase inverted band-pass filtered Height-Channel signal to be amplified for the soundbar's front firing speakers 312.

In the initial signal processing method step, a band-pass filter over the upper bass range (e.g., approximately 200 to 400 Hz or higher) is applied to each Height-Channel channel signal (both left and right height channels, whether discrete for Dolby ATMOS program material, DTS equivalent program material with discrete channels or derived height channels when using non-ATMOS program material such as Dolby Digital 5.1 or 7.1). In the next step, phase or polarity inversion of each band-pass height channel signal is applied. Depending on the product configuration (of soundbar system 260), the signal may then be attenuated by 3 to 9 dB and there may be product-dependent magnitude shaping (parametric equalization) to complete the signal processing in order to derive a corrective secondary source for substantially reducing direct in-room radiation (e.g., 213DS) from the Height-Channel loudspeaker arrays 310L, 310R, as perceived by the listener at the listening location 24. In an equivalent, alternative embodiment, the radiation pattern of the Height-Channel loudspeaker arrays 310L, 310R may be altered by reducing the beamwidth or increasing the directivity of the Height-Channel array for the cancellation signal projected toward the listener.

In the absence of imposing delay on the Height-Channel cancellation signal for the soundbar's front firing speakers 312, the derived secondary source radiation would reach listeners in advance of the direct radiation from the Height-Channel loudspeakers 310L, 310R (i.e., signal 213DS, which is supposed to be cancelled acoustically). Therefore an appropriate delay should be placed on the Height-Channel direct signal cancellation signals relative to the front channel loudspeaker radiation in order to ensure synchronous radiation in the listening area and optimal performance from the secondary sources. The delay may be computed simply by considering the distance between the acoustic center of the secondary sources (i.e., front facing soundbar speakers 312) and the acoustic center of the Height-Channel upward facing speakers in the arrays 310L, 310R.

When multiple speakers are employed, an average location is preferably derived for purposes of this delay computation:

$$\text{delay}=(A_{C,A}-A_{C,f})/c \qquad \text{Eq. 1}$$

where $A_{C,A}$=the position of the acoustic center of the Atmos transducer(s), $A_{C,f}$=the position of the acoustic center of the front baffle secondary source and c=speed of sound in air at sea level, room temperature=343 m/s. It may be noted that in some instances owing to the industrial design of the Height-Channel (e.g., ATMOS™ or DTS-X®) compatible soundbar, the computed delay may approach zero. This is especially the case for shallow soundbars whose Height-Channel arrays 310L, 310R are placed substantially over the front-baffle mounted transducers 312 aligned along speaker axis SA, in which case the front-baffle mounted transducers (e.g., 312L, 312R) most physically proximate or closest to the Height-Channel arrays 310L, 310R are selected as the secondary (cancellation) sources.

The second aspect of this invention pertains to steering the multi-element array of electro-acoustic transducers which are firing from the soundbar 260 upwardly into the listening space. By delaying the acoustic output of adjacent array elements or adjacent loudspeaker driver transducers by an appropriate amount of time, the collective output of the array (e.g., 310L and 310R) may be steered (see, e.g., the diagram of FIG. 7). This phased beam steering method is similar, in principle, to the operation of a phased array radar. Generally, the inter-element delay depends on element spacing, desired steering angle and the speed of sound in the air (e.g., of listening room 100). For example, in order to implement a steering angle of 5.0 degrees from an axis directly between the center of the soundbar and the listener for a multi element array (e.g., three element array 310L) whose center to center spacing between the three identical 25 mm drivers is 2.25 inches between adjacent elements, the time delay would be computed from the formula:

$$t=l*\tan(\text{theta})/c \qquad \text{Eq. 2}$$

where l is the inter-element spacing (2.25 in), theta is the steering angle (5 degrees) and c is the speed of sound and air (343 m/s). For this exemplary embodiment, the time delay for that 5 degree steering angle t is equal to 14.6 uSec. Further refinements to the radiation pattern may be implemented by applying particular finite impulse response ("FIR") filters to each element's magnitude response, in the manner generally known as magnitude shaping, thereby combining both phase and magnitude shaping to derive an optimized steered array response. In accordance with the present invention, signal processing methods with FIR filters for beam-shaped acoustic arrays are refined for applications including the soundbar structures illustrated in FIGS. 2-8. While the exemplary embodiment described and illustrated here includes multi (e.g., three) element arrays 310L and 310R, the structure and method of the present invention can be implemented effectively with each array comprising between 2 and 5 elements.

Referring again to FIGS. 2-5, a multi-channel single enclosure Height-Channel (e.g., ATMOS™ or DTS-X®) enabled soundbar loudspeaker system 260 is configured preferably for use with a digital signal processing method for reproducing Height-Channel audio program material with very high fidelity for listeners in a listening space 100 (e.g., including listening position 24), regardless of each listener's location relative to the loudspeaker within the listening space.

Figure 1A:
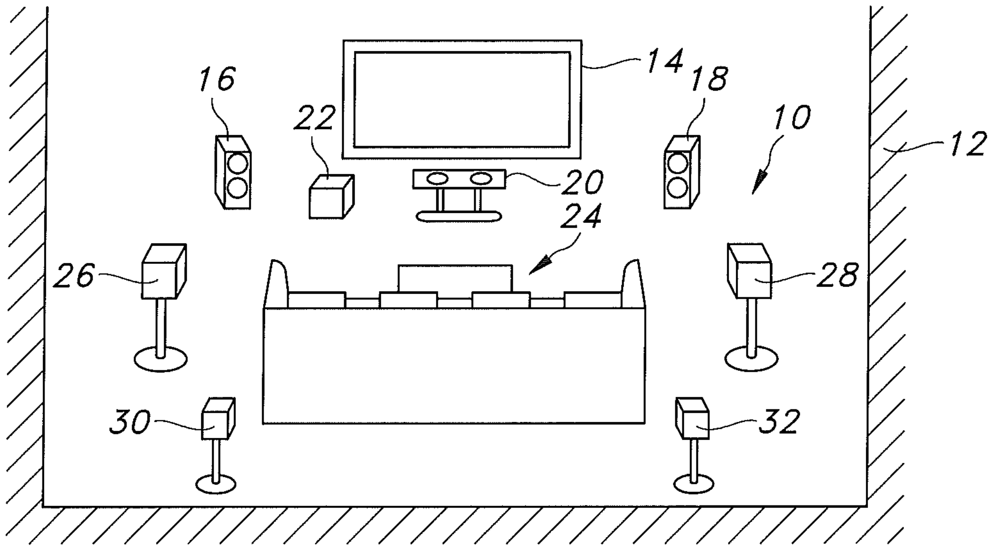
FIG. 1A (PRIOR ART)
FIGS. 1A and 1B illustrate a multi-speaker enclosure traditional home theater sound system in a home theater setting including a listening position, in accordance with the prior art.
Figure 1B:
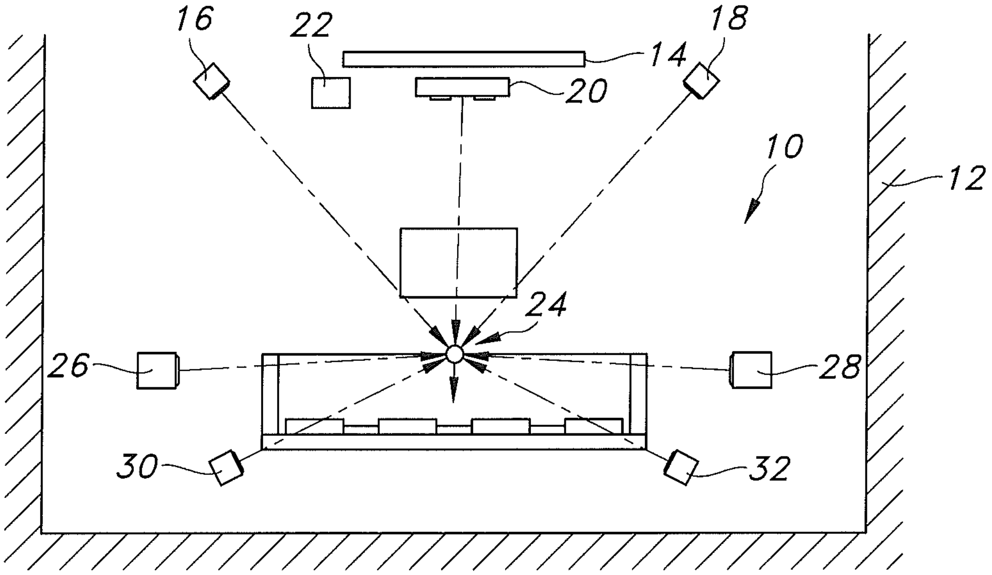
FIG. 1B (PRIOR ART)
Figure 1C:
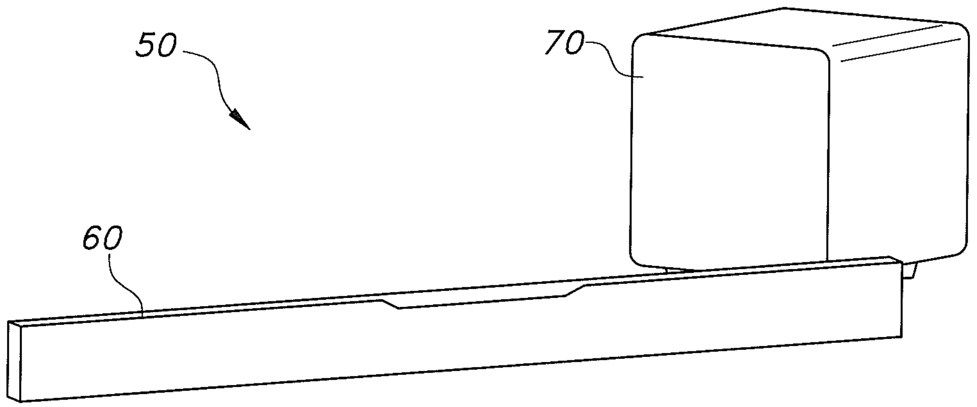
FIG. 1C (PRIOR ART)
FIGS. 1C and 1D illustrate a soundbar/subwoofer home theater sound system in a home theater user's setting including a listening position, in accordance with the prior art.
Figure 1D:
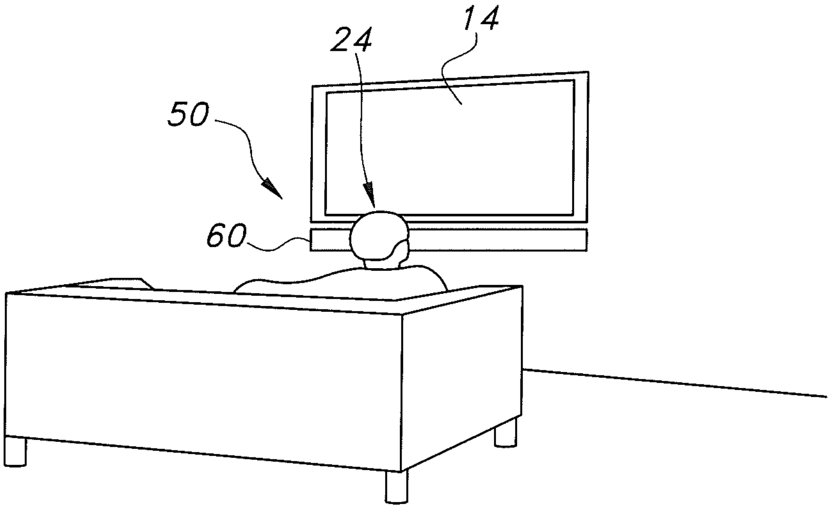
FIG. 1D (PRIOR ART)
Figure 1E:
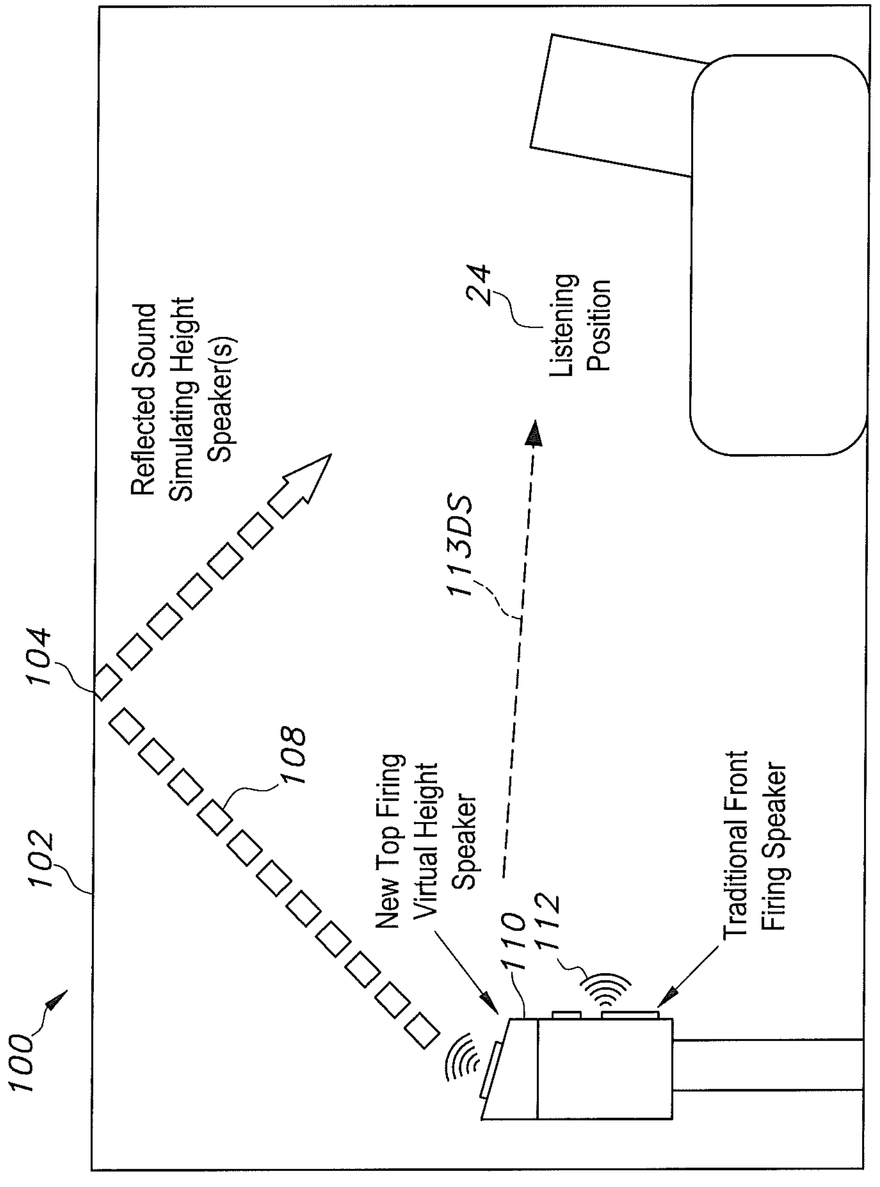
FIG. 1E is a diagram which illustrates a Dolby ATMOS home theater sound system in a home theater user's setting including a listening position (as illustrated in U.S. Pat. No. 9,648,440) with an added representation of a problematic direct radiation sound path from the Height-Channel speaker (s), in accordance with the method of the present invention.
Figure 2:
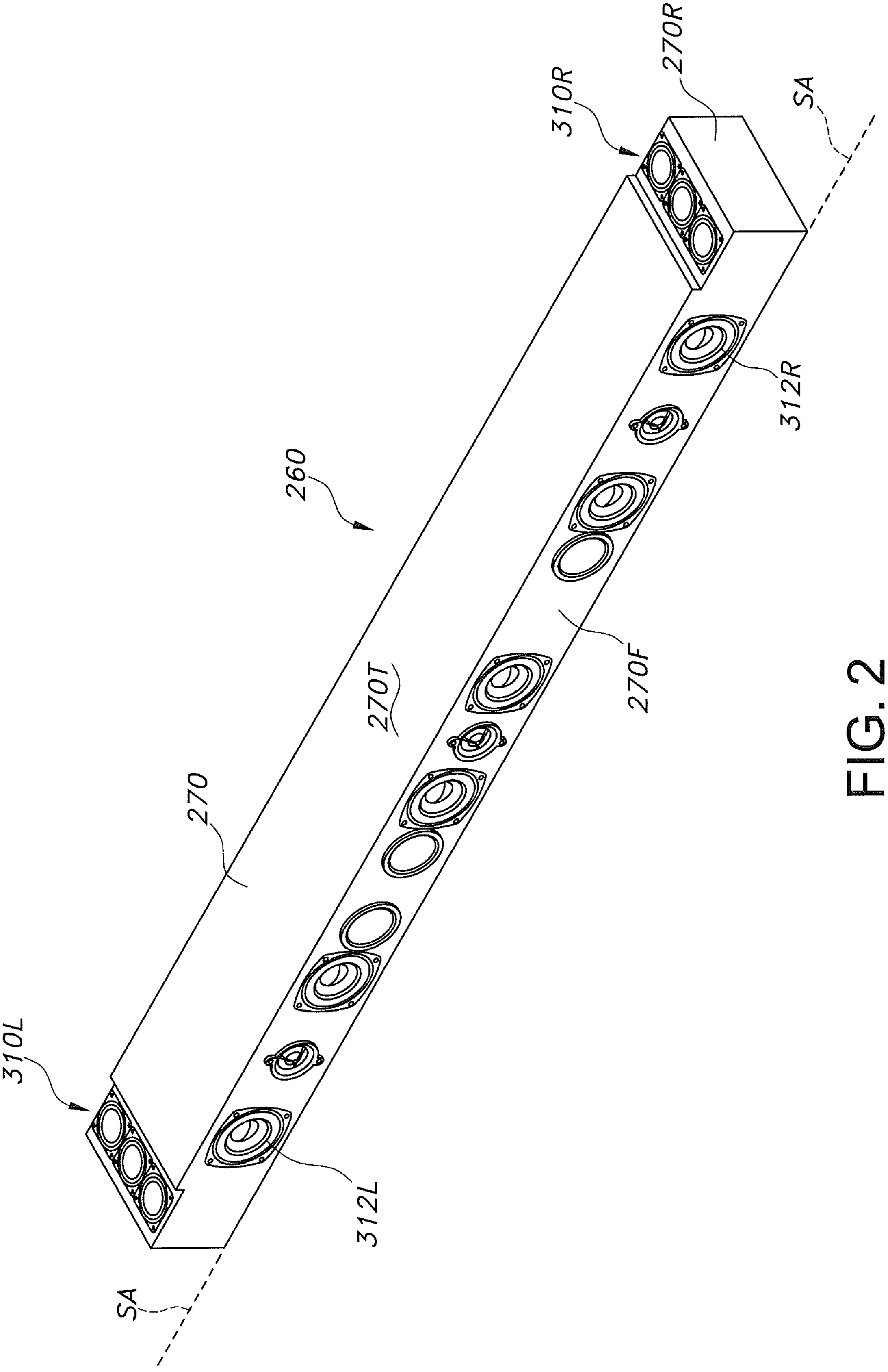
FIG. 2 is a perspective view of a virtual height or Height-Channel (e.g., ATMOS™ or DTS-X® compatible height speaker) array equipped Soundbar loudspeaker system implementing the method for Active Cancellation of the Soundbar Height-Channel array's forward sound radiation, employing the Soundbar front baffle's transducers and steering sound from the Height-Channel Arrays via Phased Array techniques, in accordance with the present invention.
Figure 3:
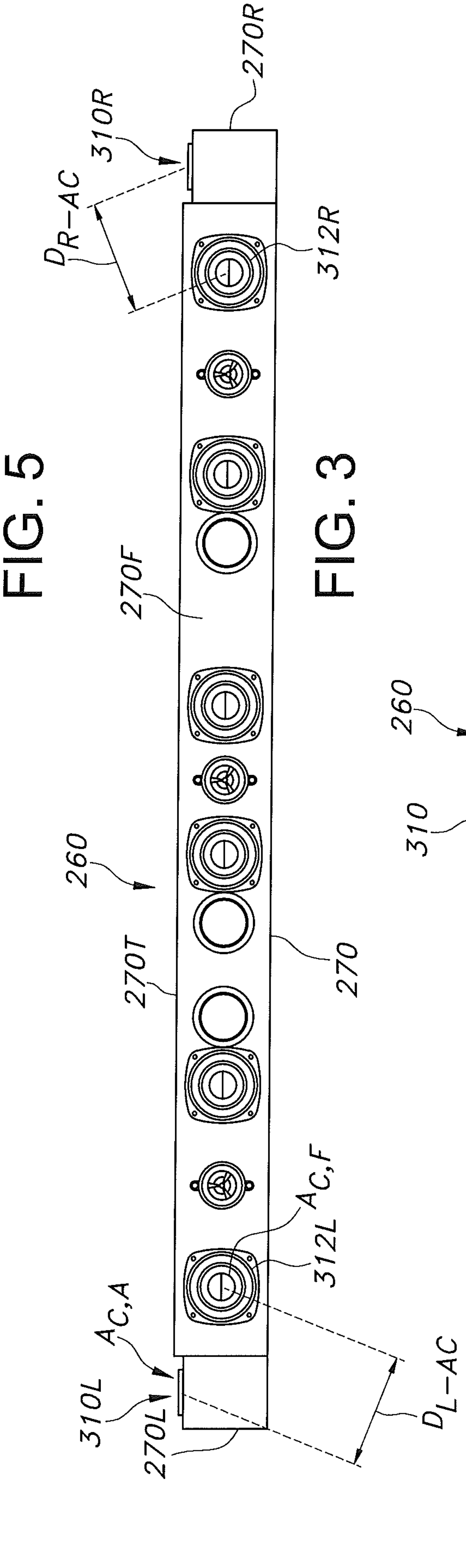
FIG. 3 is front elevation view of the Height-Channel array equipped Soundbar loudspeaker system of FIG. 2, illustrating the Soundbar front baffle's transducers, in accordance with the present invention.
Figure 4:
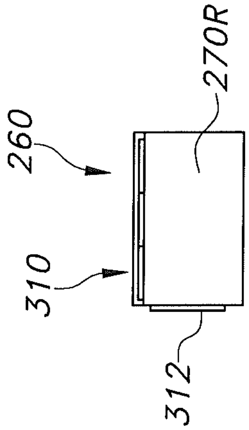
FIG. 4 is right side elevation view of the Height-Channel array equipped Soundbar loudspeaker system of FIGS. 2 and 3, illustrating the orientation of the Soundbar front baffle's transducers and the top mounted Height-Channel array, in accordance with the present invention.

Multi-driver multi-channel single enclosure Height-Channel (e.g., ATMOS™ or DTS-X®) enabled soundbar loudspeaker system 260 preferably has a single chassis including planar bottom and left and right side sidewall members which also support a substantially vertical front wall segment or planar baffle defining a speaker axis SA and having a proximal or front surface bounded by a left end opposing a right end. In the illustrated embodiment, the single enclosure Height-Channel enabled soundbar loudspeaker system's enclosure is preferably configured with a first forward facing driver 312L positioned laterally left of the enclosure center nearer the left end and a second forward facing driver 312R positioned laterally right of the enclosure center nearer the right end. The enclosure also aims and supports other midwoofer and tweeter drivers mounted and aimed forwardly, as best seen in FIGS. 2 and 3.

Multi-driver multi-channel single enclosure Height-Channel enabled soundbar loudspeaker system 260 also has an upper surface or enclosure wall segment with left and right distal ends which carry a left side upward firing array of three drivers 310L configured to generate the left Height-Channel (virtual height) channel's audio and a right side upward firing array of three drivers 310R configured to generate the right Height-Channel (virtual height) channel's audio.

The first forward facing driver 312L is driven with signals modified in accordance with the present invention to cancel any undesired horizontally projecting direct sound (e.g., 213DS, as best seen in FIG. 8) from left side Height-Channel array 310L. The distance ($D_{L\text{-}AC}$) separating the acoustic centers of Height-Channel array 310L and forward facing driver 312L is preferably less than 5.5 inches (but may be 2-8 inches from driver array 310L acoustic center to forward facing driver 312L acoustic center). A driver or array's "acoustic center" is the point from which a driver's or array's radiated sound originates and may vary with frequency but typically coincides with the junction connecting a driver's voice coil former to its diaphragm. Similarly, the second forward facing driver 312R is driven with signals modified in accordance with the present invention to cancel any undesired horizontally projecting direct sound (e.g., similar to 213DS) from right side Height-Channel array 310R. The distance ($D_{R\text{-}AC}$) separating the acoustic centers of Height-Channel array 310R and forward facing driver 312R is preferably less than 5.5 inches (but may be 2-8 inches from driver array 310R acoustic center to forward facing driver 312R acoustic center). These spacings, along with the signal processing 400 for the cancellation signals described above and shown in FIG. 6, have been discovered to be surprisingly effective in Applicant's development work.

Figure 5:
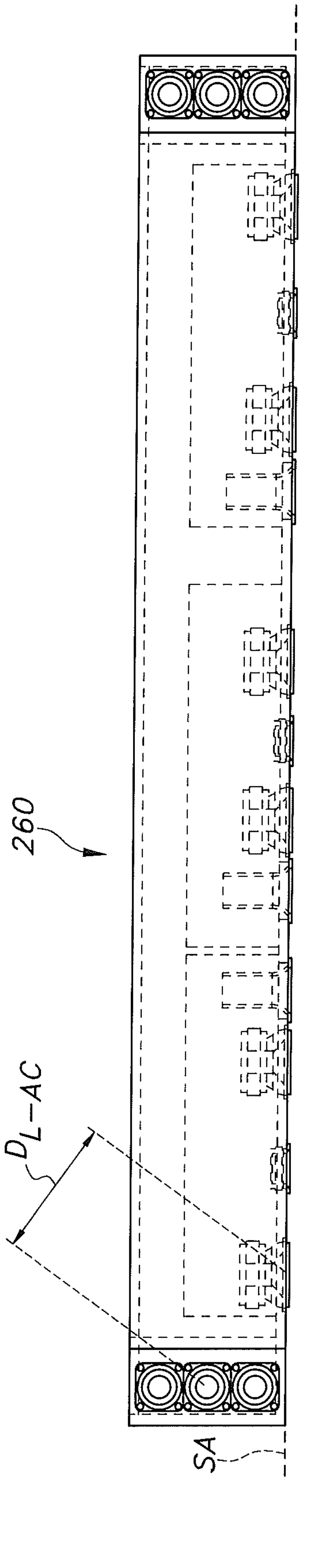
FIG. 5 is topside plan view of the Height-Channel array equipped Soundbar loudspeaker system of FIGS. 2, 3 and 4, illustrating the interior subenclosures and in hidden lines the orientation of the Soundbar front baffle's transducers in relation to the top mounted Height-Channel arrays, in accordance with the present invention.

Multi-channel single enclosure Height-Channel enabled soundbar loudspeaker system 260 preferably includes several dedicated amplifiers, each driving a corresponding loudspeaker driver (e.g., 312L, 312R) which are each mounted and acoustically sealed into one of five (5) subenclosures (as shown in FIG. 5) and includes signal processing circuitry with signal processing algorithms programmed into a microprocessor and DSP circuitry included with the dedicated power amplifiers.

FIG. 8 illustrates the enhanced Height-Channel enabled Soundbar system 260 as viewed along speaker axis SA in a user's setting 100 including a listening position 24 illustrating the orientation of the Soundbar system components with a representation of the cancelled, undesired direct radiation sound path 213DS. The radiation pattern of each Height-Channel array (310L, 310R) of enhanced soundbar system 260 is improved by effectively cancelling a significant portion of the forward radiating component (e.g., 213DS) by a employing at least one of the soundbar's front-baffle mounted mid-bass drive units (e.g., 312L). Appropriate signal processing, generally including band-pass filtering, parametric equalization and delay are applied preferably to both the left and right side Height-Channel arrays (although applying it to only one is possible). In this manner, the "secondary source" (direct radiated signal cancellation) transducers are the soundbar's mid-bass drivers which have been discovered to provide optimal performance. Another important benefit of this invention involves a requirement on the Height-Channel array in the presence of secondary cancellation sources. Without secondary cancellation sources, the Height-Channel arrays are necessarily relatively large (in the front-to-back dimension) and normally include a form of acoustic occlusion intended to block or absorb sound radiation that would otherwise radiate directly into the listening area part. Due in part to the use of the cancellation in the system of the present invention, the Height-Channel arrays themselves (e.g., 310L, 310R) may be configured as surprisingly small in the front-to-back dimension (e.g., as shown in FIGS. 2-5). This means the need for physically blocking or absorbing that undesired direct sound (e.g., 213DS) to mitigate it reaching the seating area 24 via a direct path is greatly reduced by virtue of the inclusion of the cancellation transducers (e.g., 312L, 312R). The phased array and steering aspect of the system and method of the present invention thus provides a number of advantages. The inclusion of phased array steering permits a wider range of seating locations (e.g., 24) without compromising audio performance. An automated calibration scheme that determines the optimal steering angle (e.g., Θ, as illustrated in FIG. 7) for selected listening locations results in superior audio performance relative to conventional Height-Channel (e.g., ATMOS™ or DTS-X®) enabled soundbars in which Height-Channel arrays are fixed with respect to steering angle.

Persons of skill in the art will recognize that the present invention makes available a system and method for Active Cancellation of a Height-Channel array's forward sound radiation (e.g., 213DS) employing the Soundbar front baffle's transducers and steering the sound projecting from the Height-Channel arrays via Phased Array techniques. The invention also comprises a multi-channel single enclosure Height-Channel (e.g., ATMOS™ or DTS-X®) enabled soundbar loudspeaker system 260, including first enclosure 270 having front baffle surface 270F aligned along speaker axis SA and terminating on opposing lateral sides with substantially transverse left and right sidewall surfaces 270L, 270R and terminating along its upper edge with a top wall surface 270T.

Soundbar loudspeaker enclosure 270 preferably has a plurality of acoustically isolated sub-enclosures, and in FIG. 5, it is illustrated that the Height-Channel arrays 310L, 310R each fire upwardly from a dedicated sub-enclosure having a selected volume of 10 cu. In. (for each array's group of three 25 mm drivers). The internal volume of exemplary soundbar enclosure 270 also includes three additional sub-enclosures corresponding to the internal volumes dedicated to left, center and right channel loudspeaker drivers, each of those subenclosures having a selected internal volume of 1.33 L. Each of the L, C, and R sub-enclosures are defined behind the front baffle surface 270F and provide a ported sub-enclosure volume for a pair of mid-bass drivers arrayed laterally around a dedicated 25 mm tweeter along speaker axis SA (as best seen in FIG. 5).

Soundbar loudspeaker system enclosure 270 supports and aims loudspeaker drivers or transducers including aa first, left-main and Height-Channel direct signal cancellation loudspeaker driver 312L mounted on front baffle 270F, proximate left sidewall 270L, (ii) second, right-main and Height-Channel direct signal cancellation loudspeaker driver 312R, mounted on front baffle 270F, proximate the right sidewall 270R, and (iii) a first, left three driver Height-Channel speaker array 310L aimed upwardly from the top wall surface 270T, proximate left sidewall 270L and having its acoustic center spaced from the left-main and Height-Channel direct signal cancellation loudspeaker driver 312L by a selected distance DL-AC in the range of 2 to 6 inches (e.g., 2-3 inches, and preferably less than 5.5 inches). Soundbar loudspeaker system 260 enclosure 270 also supports and aims (iv) a second, right Height-Channel speaker array 310R aimed upwardly from the top wall surface, proximate the right sidewall and having its acoustic center spaced from the right-main and Height-Channel direct signal cancellation loudspeaker driver 312R by a distance DR-AC in the range of 2 to 6 inches (e.g., 2-3 inches, and preferably less than 5.5 inches).

As illustrated in FIGS. 3 and 6, soundbar loudspeaker system 260 has left ("L") and right ("R") Height-Channel (e.g., ATMOS™ or DTS-X®) signal inputs, signal processing and $1^{st}$ and $2^{nd}$ amplifiers connected to the left-main and Height-Channel direct signal cancellation loudspeaker driver 312L and the right-main and Height-Channel direct signal cancellation loudspeaker driver 312R. The signal processing 400 for the L and R Height-Channel signal inputs and $1^{st}$ and $2^{nd}$ amplifiers (e.g., 420) connected to the left-main and Height-Channel direct signal cancellation loudspeaker driver 312L and the right-main and Height-Channel direct signal cancellation loudspeaker driver 312L, 312R, a selected band pass filter 404 (e.g., 200-400 Hz or higher) for generating filtered L and R Height-Channel signals 406, a phase inversion 408 configured to invert the phase of the filtered L and R Height-Channel signals for generating filtered, inverted L and R Height-Channel signals 410, and attenuation (and optionally, a delay, in block 412) configured to provide about 3-9 dB of attenuation to generate level adjusted (and optionally delayed) filtered, inverted L and R direct Height-Channel cancellation signals 414. It is expected that for certain product configurations, the signal processing method of the present invention may also include some corrective (compensating) parametric equalization ("EQ") which is not shown in FIG. 6, but which may be incorporated into the method of generating the level adjusted (and optionally delayed and EQ'd) filtered, inverted L and R direct Height-Channel cancellation signals 414. The process steps illustrated in FIG. 6 are exemplary, and using analog or digital signal processing there are other sequences for combining these method steps or processes to arrive at generating the desired level adjusted (and optionally delayed and EQ'd) filtered, inverted L and R direct Height-Channel cancellation signals 414.

In an alternative prototype for the steered "beam" direction for the sound from the Height-Channel arrays (e.g., 310L, 310R, see FIG. 6), the acoustic centers of the three drivers (e.g., in array 310L) span a distance "l" of 4.5 inches so for a beam steered to a desired angle theta ("Θ") of 5 degrees:

$$d = l\tan\Theta = 0.394'' \quad \text{(Eq. 3)}$$

$$\text{So } t = \frac{(0.394')(2.54\ \text{cm/in})(1\ \text{m}/100\ \text{cm})}{342\ \text{m/s}} \quad \text{(Eq. 4)}$$

Thus t=2.924 ($10^{-5}$) seconds or about 0.03 mS (for Θ of 5 degrees). As noted above, while the exemplary embodiment described and illustrated here includes three element Height-Channel arrays 310L and 310R, the structure and beam steering method of the present invention can be implemented effectively with each array comprising between 2 and 5 elements with slightly different spacings.

In multi-driver multi-channel single enclosure Height-Channel (e.g., ATMOS™ or DTS-X®) enabled soundbar loudspeaker system 260, each Height-Channel array is steered at a selected ceiling bounce angle (e.g., between 5 degrees and 20 degrees, depending, in part, on where soundbar enclosure 270 is mounted and how deep, front to back, the enclosure will be), so steering delay "t" may be selected to correspond to the desired ceiling bounce angle and may be in the range of 0.03 ms to 1.3 ms or more, depending on the placement and size of the drivers in each Height-Channel array (e.g., 310L). Referring to FIGS. 3, 5 and 7, it is illustrated that the multi-channel single enclosure Height-Channel enabled soundbar loudspeaker system 260 has a planar horizontal top wall surface 270T carrying the first, left ATMOS speaker array 310L which comprises an array of three drivers aligned on an axis parallel to the enclosure sidewall 270L and the array is driven with signals to project Height-Channel sound upwardly from the enclosure's top wall surface at a first selected ceiling bounce angle in the range of 5 to 20 degrees; and said second, right Height-Channel speaker array 310R also comprises an array of three drivers aligned on an axis and projects Height-Channel sound aimed upwardly at that same first selected ceiling bounce angle.

Referring again to FIGS. 2-5 and 8, loudspeaker system 260 includes First and Second elevation signal related sound sources, namely (a) the Top-firing elevation speaker (i.e., transducer or array) 310L and (b) a Cancellation speaker (i.e., transducer or array) 312L. Cancelling speaker 312L is driven with a signal that is band pass filtered to limit cancellation to midrange frequencies (e.g., 200-400 Hz), a strategy which relies on the fact that Low frequencies are less localizable for the listener. An all pass filter may allow cancellation speaker 312L to reinforce low frequencies, while High frequencies are adequately controlled by the top-mounted elevation speaker 310L. The directivity of cancelling speaker 312L is preferably chosen to reduce unwanted reflections, especially from the floor and ceiling. Hence, larger transducers are better for cancellation speaker 312L. The distance from cancelling speaker 312L to listener L is preferably substantially equal to or as close as possible to the distance of top firing speaker 310L to listener L in order to reduce phase error (leading to less effective cancellation). As noted above, the Haas effect helps listener L to localize the top speaker reflection sound (from 308).

As noted above, for purposes of defining a broad descriptive nomenclature, in this application, the terms ATMOS or DTS-X are used not as trademarks but instead are used nominatively and interchangeably to describe, generically, Virtual Height signals and speakers intended to create the desired vertically immersive elevation effect, so left and right side Virtual Height sound projecting speaker arrays (310L, 310R) are referred to variously as Height-Channel arrays or ATMOS arrays, and so the term ATMOS is refers broadly to Height-Channel or Virtual Height signals, speakers, signal processing circuits or DSP methods intended to facilitate or create the desired vertically immersive elevation effect.

Having described preferred embodiments of a new and improved loudspeaker system and signal processing method, it is believed that other modifications, variations and changes will be suggested to those skilled in the art in view of the teachings set forth herein. It is therefore to be understood that all such variations, modifications and changes are believed to fall within the scope of the present invention.

What is claimed is:

1. A multi-channel single enclosure Height-Channel enabled soundbar loudspeaker system, comprising:

an enclosure having a front baffle surface, a top wall surface, a left sidewall, and a right sidewall, the front baffle surface including an upper edge, the front baffle surface terminating along the upper edge with the top wall surface;

a left-main and Height-Channel direct signal cancellation loudspeaker driver mounted at the front baffle surface;

a right-main and Height-Channel direct signal cancellation loudspeaker driver mounted at the front baffle surface;

a left Height-Channel speaker driver or multi-element array aimed upwardly from the top wall surface, positioned proximate to the left sidewall, and having a first acoustic center spaced from the left-main and Height-Channel direct signal cancellation loudspeaker driver by a distance $D_{L\text{-}AC}$ in a range of 2 to 8 inches; and a right ATMOS Height-Channel speaker driver or multi-element array aimed upwardly from the top wall surface, positioned proximate to the right sidewall, and having a second acoustic center spaced from the right-main and Height-Channel direct signal cancellation loudspeaker driver 312R by a distance $D_{R\text{-}AC}$ in a range of 2 to 8 inches.

2. The multi-channel single enclosure Height-Channel enabled soundbar loudspeaker system of claim 1, wherein:

the front baffle surface is aligned along a speaker axis SA, and terminates on opposing lateral sides at the left and right sidewalls that are substantially transverse to the front baffle surface;

the left-main and Height-Channel direct signal cancellation loudspeaker driver is proximate to the left sidewall; and the right-main and Height-Channel direct signal cancellation loudspeaker driver is proximate to the right sidewall.

3. The multi-channel single enclosure Height-Channel enabled soundbar loudspeaker system of claim 2, wherein:

the left Height-Channel speaker driver or multi-element array is aimed upwardly from the top wall surface, proximate the left sidewall, and has the first acoustic center spaced from the left-main and Height-Channel direct signal cancellation loudspeaker driver by a distance $D_{L\text{-}AC}$ in a range of 2 inches to less than 8 inches; and the right Height-Channel speaker driver or multi-element array is aimed upwardly from the top wall surface, proximate the right sidewall, and has the second acoustic center spaced from the right-main and Height-Channel direct signal cancellation loudspeaker driver by a distance $D_{R\text{-}AC}$ in a range of 2 inches to less than 8 inches.

4. The multi-channel single enclosure Height-Channel enabled soundbar loudspeaker system of claim 1, further comprising left and right Height-Channel signal inputs, signal processing, and first and second amplifiers connected to the left-main and Height-Channel direct signal cancellation loudspeaker driver and the right-main and Height-Channel direct signal cancellation loudspeaker driver, respectively.

5. The multi-channel single enclosure Height-Channel enabled soundbar loudspeaker system of claim 4, wherein the signal processing comprises a band pass filter for generating filtered left and right Height-Channel signals, and a phase inversion configured to invert the phase of the filtered left and right Height-Channel signals for generating filtered, inverted left and right Height-Channel signals.

6. The multi-channel single enclosure Height-Channel enabled soundbar loudspeaker system of claim 5, wherein the signal processing further comprises:

attenuation configured to provide about 3-9 dB of attenuation to generate level adjusted filtered, inverted left and right direct Height-Channel cancellation signals.

7. The multi-channel single enclosure Height-Channel enabled soundbar loudspeaker system of claim 6, wherein the signal processing further comprises a delay configured to generate level adjusted and delayed filtered, inverted left and right direct Height-Channel cancellation signals.

8. The multi-channel single enclosure Height-Channel enabled soundbar loudspeaker system of claim 1, wherein:

the left Height-Channel speaker driver or multi-element array comprises a first multi-element array of two to five drivers aligned on an axis and aimed upwardly from the top wall surface at a selected ceiling bounce angle in the range of 5 to 20 degrees; and the right Height-Channel speaker driver or multi-element array comprises a second multi-element array of two to five drivers aligned on an axis and aimed upwardly at the selected ceiling bounce angle.

9. The multi-channel single enclosure Height-Channel enabled soundbar loudspeaker system of claim 8, wherein the first multi-element array comprises a phased array of drivers aligned on the axis and is, via selected delay processing, aimed upwardly from the top wall surface at the selected ceiling bounce angle in the range of 5 to 20 degrees.

10. The multi-channel single enclosure Height-Channel enabled soundbar loudspeaker system of claim 9, wherein the first multi-element array comprises a phased array of drivers aligned on the axis and is, via selected delay processing, aimed upwardly from the top wall surface at a selected ceiling bounce angle of 15 degrees.

11. The multi-channel single enclosure Height-Channel enabled soundbar loudspeaker system of claim 1, wherein:

the distance $D_{L-AC}$ is in a range of 2 to 3 inches; and the distance $D_{R-AC}$ is in a range of 2 to 3 inches.

12. The multi-channel single enclosure Height-Channel enabled soundbar loudspeaker system of claim 1, wherein:

the distance $D_{L-AC}$ is less than 5.5 inches;

the distance $D_{R-AC}$ is less than 5.5 inches.

13. The multi-channel single enclosure Height-Channel enabled soundbar loudspeaker system of claim 1, wherein:

the left Height-Channel speaker driver or multi-element array is configured to generate an undesired direct radiation signal radiating directly towards the listening area; and the left-main and Height-Channel direct signal cancellation loudspeaker driver is configured to generate a cancellation signal to substantially reduce audible adverse effects of the undesired direct radiation signal, the cancellation signal generated, at least in part, by inversion of a signal derived from the undesired direct radiation signal.

14. A method for generating an enhanced vertically enveloped listening experience for a listener at a listening position 24 in a room, comprising:

providing a multi-channel single enclosure Height-Channel enabled soundbar loudspeaker system comprising an elongated enclosure, a Height-Channel direct signal cancellation loudspeaker driver, and a Height-Channel speaker driver or multi-driver array, the elongated enclosure having a front baffle surface, a too wall surface, and a left sidewall, the front baffle surface terminating along an upper edge thereof with the top wall surface, the Height-Channel direct signal cancellation loudspeaker driver mounted at the front baffle surface, and the Height-Channel speaker driver or multi-driver array aimed upwardly from the top wall surface, positioned proximate to the left sidewall, and having an acoustic center spaced from the Height-Channel direct signal cancellation loudspeaker driver by a distance $D_{L-AC}$ in a range of 2 to 8 inches;

receiving, in the single enclosure Height-Channel enabled soundbar loudspeaker system, a Height-Channel signal, and generating a phase inverted Height-Channel signal in response thereto; and driving the Height-Channel direct signal cancellation loudspeaker driver with a direct cancellation drive signal generated in response to the phase inverted Height-Channel signal, thereby reducing audible adverse effects of direct sound at the listening position.

15. The method for generating an enhanced vertically enveloped listening experience of claim 14, wherein said driving the Height-Channel direct signal cancellation loudspeaker driver with the direct cancellation drive signal comprises receiving the Height-Channel signal and band-pass filtering the Height-Channel signal to generate a band pass filtered Height-Channel signal.

16. The method for generating an enhanced vertically enveloped listening experience of claim 15, wherein said driving the Height-Channel direct signal cancellation loudspeaker driver with the direct cancellation drive signal further comprises inverting the phase of the band pass filtered Height-Channel signal to generate an inverted phase band pass filtered Height-Channel signal.

17. The method for generating an enhanced vertically enveloped listening experience of claim 16, wherein said driving the Height-Channel direct signal cancellation loudspeaker driver with the direct cancellation drive signal further comprises attenuating the inverted phase band pass filtered Height-Channel signal by a selected attenuation level of 3-9 db to generate a level adjusted filtered, inverted direct Height-Channel cancellation signal.

18. The method for generating an enhanced vertically enveloped listening experience of claim 17, wherein said driving the Height-Channel direct signal cancellation loudspeaker driver with the direct cancellation drive signal further comprises amplifying the level adjusted filtered, inverted direct Height-Channel cancellation signal to generate the direct cancellation drive signal.

19. A method for generating an enhanced vertically enveloped listening experience for a listener at a listening position in a room, comprising:

providing a multi-channel single enclosure Height-Channel enabled soundbar loudspeaker system comprising:

an enclosure having a front baffle surface, a top wall surface, a left sidewall, and a right sidewall, the front baffle surface terminating along an upper edge thereof with the top wall surface, the front baffle surface being aligned along a speaker axis SA and terminating on opposing lateral sides with the left and right sidewalls, which are substantially transverse to the front baffle surface;

a left Height-Channel direct signal cancellation loudspeaker driver mounted at the front baffle surface proximate to the left sidewall;

a right Height-Channel direct signal cancellation loudspeaker driver mounted at the front baffle surface proximate to the right sidewall;

a left Height-Channel speaker driver or multi-driver array aimed upwardly from the top wall surface, positioned proximate to the left sidewall, and having a first acoustic center spaced from the left Height-Channel direct signal cancellation loudspeaker driver by a distance DL-AC in a range of 2 to 8 inches; and a right Height-Channel speaker driver or multi-driver array aimed upwardly from the top wall surface, positioned proximate to the right sidewall, and having a second acoustic center spaced from the right Height-Channel direct signal cancellation loudspeaker driver by a distance $D_{R\text{-}AC}$ in a range of 2 to 8 inches;

receiving, in the soundbar loudspeaker system, a left Height-Channel signal, and generating a phase inverted left Height-Channel signal in response thereto; and driving the left Height-Channel direct signal cancellation loudspeaker driver with a first direct cancellation drive signal generated in response to the phase inverted left Height-Channel signal, thereby reducing audible adverse effects of direct sound at the listening position from the left Height-Channel speaker driver or multi-driver array.

20. The method for generating an enhanced vertically enveloped listening experience of claim 19, further comprising:

receiving, in the soundbar loudspeaker system, a right Height-Channel signal, and generating a phase inverted right Height-Channel signal in response thereto; and driving the right Height-Channel direct signal cancellation loudspeaker driver with a second direct cancellation drive signal generated in response to the phase inverted right Height-Channel signal, thereby reducing audible adverse effects of direct sound at the listening position from the right Height-Channel speaker driver or multi-driver array.

* * * * *